Patented Feb. 13, 1934

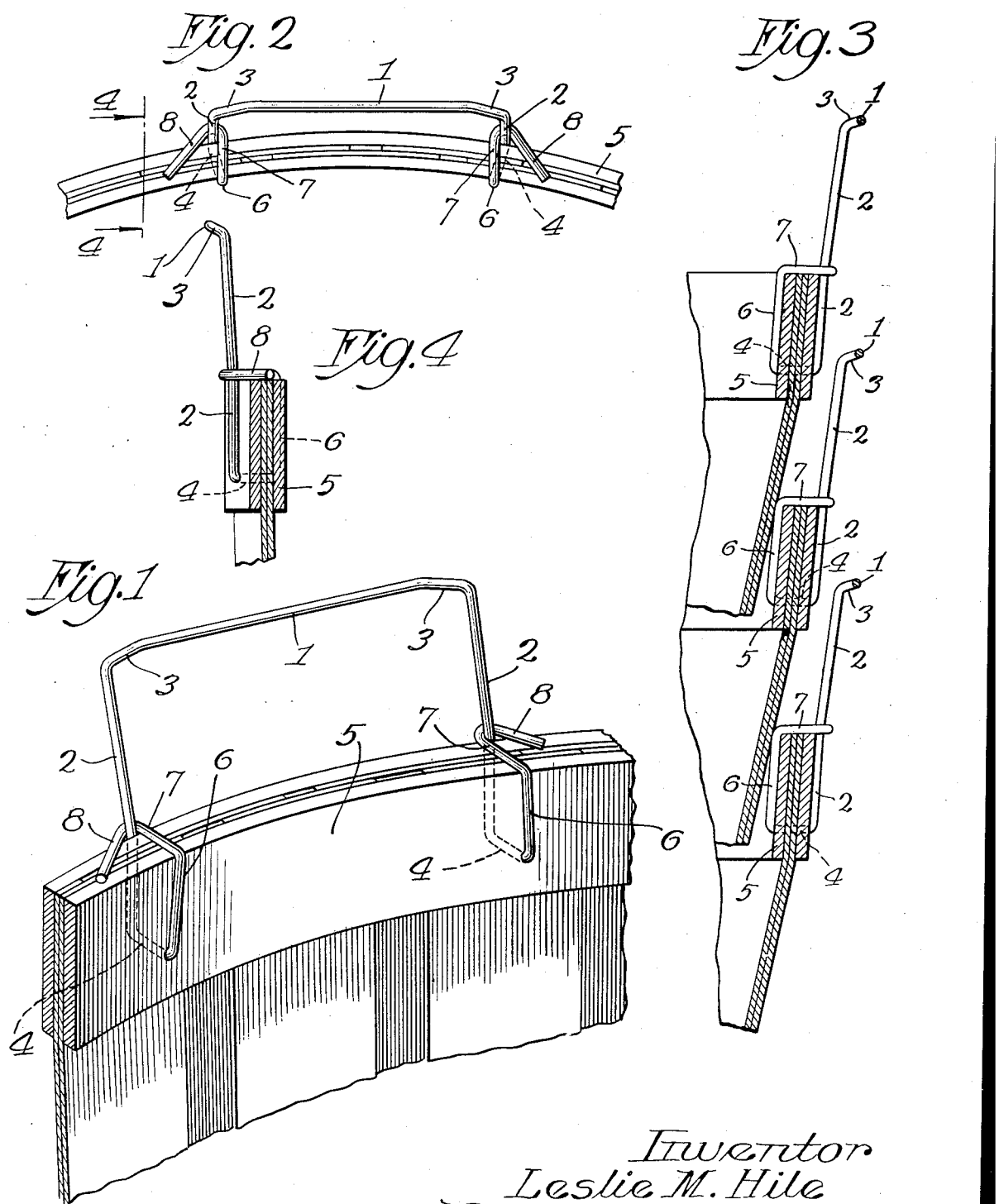

1,946,794

UNITED STATES PATENT OFFICE 1,946,794

WIRE HANDLE FOR BASKETS

Leslie M. Hile, Benton Harbor, Mich.

Application November 7, 1931. Serial No. 573,548

7 Claims. (Cl. 217—125)

This invention relates to wire handles for baskets, such as bushel and half-bushel baskets, or other similar containers requiring bail-shaped wire handles.

Generally stated, the object of the invention is to provide a novel and improved construction and arrangement whereby the transverse top portion of the bail-shaped handle is bent or sprung out of line with the vertically disposed legs or side portions of the handle, whereby the said top portion of the handle has a straight middle portion terminating in oblique and inwardly bent portions, which latter are interposed between the said middle portion and the upper ends of the said vertically disposed sides of the handle, whereby the stacking of baskets of this kind is facilitated and rendered more satisfactory, the formation of the handle in this manner tending to prevent interference with the stacking or nesting of the baskets in the well known manner.

It is also an object to provide certain details and features of construction and combinations tending to increase the general efficiency and the desirability of a wire handle of this particular character.

To the foregoing and other useful ends, the invention consists in the matters hereinafter set forth and claimed, and shown in the accompanying drawing, in which,—

Fig. 1 is a perspective of a wire handle embodying the principles of the invention, showing the adjacent portions of a basket to which the handle is attached.

Fig. 2 is a plan view of said handle and said portion of the basket.

Fig. 3 is a vertical section through the side portions of a plurality of baskets, having handles of the kind shown and described, illustrating the manner in which baskets having handles of this kind are stacked.

Fig. 4 is a vertical section on line 4—4 in Fig. 2, looking at the handle from one side thereof.

As thus illustrated, the invention comprises a bail-shaped wire handle comprising a transverse top portion 1, vertically disposed legs or side portions 2, oblique portions 3 interposed between the middle portion 1 and the upper ends of the side portions 2, bottom portions 4 which are inserted inwardly through the basket rim 5, inside portions 6 that are bent upwardly against the inner side of the basket rim, bent portions 7 that extend outwardly across the basket rim, and hook portions 8 that are hooked around the portions 2, with the ends or tips of the hooks resting upon the upper edge of the basket rim. Preferably, the said ends or tips of the hooks are disposed outside of the handle side portions 2, so that when the hand is inserted through the handle, it will not be liable to be scratched or injured by the said hook ends or tips.

With this construction, it will be seen that the portions of the sides 2 above the hooks 8 are inclined slightly outwardly, the bend in each handle side portion being at the point where it engages the bend of one of the hooks. This outward inclination or slant of the handles is well known, and is ordinarily for the purpose of facilitating the stacking or nesting of the baskets, the idea being that when the handles are thus inclined outwardly, they will not be so liable to catch on the sides or bottoms of the baskets, and will be less liable to interfere with the stacking or nesting, as shown, for example, in Fig. 3 of the drawing.

However, by bending the end portions 3 of the top of the handle at oblique angles, as shown, so that the middle portion 1 of the handle top is offset, so to speak, and is not in the plane of the side portions 2, it is found that less outward slant or inclination of the side portions 2 is necessary in order to insure the desired results. In other words, with the top of the handle formed with the portions 1 and 3, as shown, there is less liability of these handles catching on the bottoms or sides of the baskets, when they are stacked or nested together, even if the sides of the handles are not tilted or inclined outwardly. However, it is preferable, in addition to the said formation of the top portion of the handle, to at least slightly incline the sides of the handle outwardly, as the two features together or in combination cooperate to insure the desired result, which is non-interference between the handles and the bottoms and sides of the baskets when they are stacked or nested together. It will be understood that, when the baskets are stacked or nested together, they need not necessarily be arranged this way, with their handles all in line, at opposite sides of the stack, but, regardless of whether they are arranged with their handles in line or out of line, the new formation of the handles serves the desired purpose of preventing, or at least greatly reducing, the possibility of interference between the handles and the bottoms and sides of the baskets in the stacking or nesting operation.

In other words, the top or grip portion of the handle is dished, so to speak, on the inner side thereof, in effect, so that it is in effect concave on its inner side and convex on its outer side.

Furthermore, in some ways the handle top or grip thus formed is found to be more comfortable in the hand, when the basket is lifted by the handles. In other words, the handle top or grip is offset, in an outward direction, which not only tends to reduce interference between the handles and the bottoms and sides of the baskets, when they are nested or stacked together, but which also is found in some ways to be more satisfactory to the hands in lifting the basket, it being observed that the portions 3 will rest obliquely across the first and fourth fingers of the hands, while the portion 1 will extend at right angles to the second and third fingers of the hands, so that the pressure of the grip on the hand is not entirely in a straight line.

It will be seen that the portions 3 and the portion 1 are in the same inclined plane, inasmuch as the portions 3 are not only bent inwardly, but also slope downwardly to some extent, from the ends of the portion 1 to the upper ends of the portions 2. Thus these portions 3 are oblique when viewed from above, and are also oblique to the portion 1 when viewed from either the outer or inner side of the handle, as shown more clearly in Fig. 1 of the drawing. Thus, in addition to being in effect concave on its inner side and convex on its outer side, the handle top or grip is provided with a middle portion 1 which is displaced upwardly a distance, so that this middle portion occupies an elevated position, more or less, above the upper ends of the side portions 2 of the handle. This formation, therefore, as explained, is found to be more satisfactory in actual use, when the baskets are being lifted and carried around, particularly when they are loaded, for the reasons described.

Thus with the construction shown and described, which is illustrative of the invention, obtuse angles 9 are formed at the upper ends of the side portions 2, and still more obtuse angles 10 are formed between the end portions 3 and the middle portion 1 of the handle.

What I claim as my invention is:

1. A wire handle for baskets or containers, of substantially bail-shaped form, having side portions attached to the rim of the container, and having a top portion or grip formed with a relatively long straight middle portion, and with relatively short portions interposed between said middle portion and the upper ends of said side portions, said short portions being oblique to the middle portion when viewed from above, and also when viewed horizontally, whereby said middle portion is offset outwardly, and is thereby outside the plane of said side portions.

2. A structure as specified in claim 1, said middle portion and said oblique portions being in the same inclined plane, whereby said top portion or grip is in effect concave on its inner side and convex on its outer side.

3. A structure as specified in claim 1, said side portions being inclined outwardly.

4. A structure as specified in claim 1, comprising wire end portions which are hooked around the said side portions of the handle, with the side portions tilted or inclined outwardly from the point of engagement with the hooks.

5. A structure as specified in claim 1, said middle portion being of greater length than said oblique portions, whereby said oblique portions form relatively short integral connections between said middle portion and the upper ends of said side portions, whereby said middle portion is disposed in a vertically disposed plane spaced a distance outwardly from the plane of said side portions.

6. A structure as specified in claim 1, said oblique portions extending more or less downwardly from said middle portion to the upper ends of said side portions, whereby said middle portion is elevated a distance above the upper ends of the side portions.

7. A wire handle for baskets or containers, comprising upright side portions attached to the container rim, and a top portion or grip having a straight horizontal middle portion thereof displaced or elevated a distance more or less above the upper ends of the side portions, and having straight downwardly inclined end portions between said straight middle portion and said upright side portions, forming obtuse angles at the upper ends of the side portions, and still more obtuse angles between said end portions and said middle portion.

LESLIE M. HILE.